United States Patent
Kim et al.

(10) Patent No.: US 9,005,553 B2
(45) Date of Patent: Apr. 14, 2015

(54) APPARATUS FOR SOLIDIFYING AND CONVERTING CARBON DIOXIDE INTO CARBONATE

(75) Inventors: Tae Young Kim, Gyeonggi-do (KR); Sung Yeup Chung, Seoul (KR); Ki Chun Lee, Seoul (KR); Dong Cheol Park, Incheon (KR); Min Ho Cho, Gyeonggi-do (KR); Seok Gyu Sonh, Gyeonggi-do (KR)

(73) Assignees: Hyundai Motor Company, Seoul (KR); Kia Motors Corporation, Seoul (KR); Hyundai Steel Company, Incheon (KR)

( * ) Notice: Subject to any disclaimer, the term of this patent is extended or adjusted under 35 U.S.C. 154(b) by 694 days.

(21) Appl. No.: 13/298,619

(22) Filed: Nov. 17, 2011

(65) Prior Publication Data

US 2013/0052088 A1 Feb. 28, 2013

(30) Foreign Application Priority Data

Aug. 30, 2011 (KR) ........................ 10-2011-0086818

(51) Int. Cl.
*B01J 19/00* (2006.01)
*C01B 31/24* (2006.01)
*C01F 11/18* (2006.01)
*B01J 19/18* (2006.01)
*B01J 19/24* (2006.01)
*B01J 8/00* (2006.01)
*C01D 7/00* (2006.01)

(52) U.S. Cl.
CPC ................. *C01B 31/24* (2013.01); *C01F 11/18* (2013.01); *C01P 2004/61* (2013.01)

(58) Field of Classification Search
CPC ............... B01J 4/00; B01J 4/004; B01J 7/00; B01J 8/00; B01J 8/005; B01J 8/008; B01J 10/00; B01J 10/007; B01J 12/00; B01J 12/007; B01J 14/00; B01J 19/00; B01J 19/082; B01J 19/18; B01J 19/1809; B01J 19/1818; B01J 19/24; B01J 2219/00; B01J 2219/0004; B01D 3/00; B01D 3/009
USPC .......................... 422/119, 129, 187, 600, 630
See application file for complete search history.

(56) References Cited

U.S. PATENT DOCUMENTS

2007/0202032 A1* 8/2007 Geerlings et al. .......... 423/419.1
2011/0139628 A1   6/2011 Teir et al.

FOREIGN PATENT DOCUMENTS

JP 2005074310 A 3/2005
JP 2005097072 A 4/2005
(Continued)

OTHER PUBLICATIONS

Machine translation of JP 2005-097072 A, which was published Apr. 14, 2005 and provided in IDS filed Nov. 17, 2011.*

*Primary Examiner* — Natasha Young
(74) *Attorney, Agent, or Firm* — Mintz Levin Cohn Ferris Glovsky and Popeo, P.C.; Peter F. Corless

(57) ABSTRACT

The present invention provides an apparatus for solidifying and converting carbon dioxide into carbonate, comprising: an alkali component extraction reactor for extracting an alkali metal component from a raw slag; a carbonation reactor for injecting carbon dioxide into an alkali metal component solution containing the extracted alkali metal component to produce a carbonate precipitate from the alkali metal component solution; a first filtration device connected between the alkali component extraction reactor and the carbonation reactor to separate a post-treatment slag, from which the alkali component is extracted, from the alkali metal component solution; and a second filtration device connected between an inlet of the alkali component extraction reactor and an outlet of the carbonation reactor to separate the carbonate from the alkali metal component solution after the carbonation reaction.

5 Claims, 3 Drawing Sheets

(56) References Cited

FOREIGN PATENT DOCUMENTS

| | | |
|---|---|---|
| KR | 10-2004-0087052 A | 10/2004 |
| KR | 10-0891551 | 3/2009 |
| KR | 10-0958593 B1 | 5/2010 |
| WO | WO 2009/144382 A2 * | 12/2009 |

* cited by examiner

APPARATUS FOR SOLIDIFYING AND CONVERTING CARBON DIOXIDE INTO CARBONATE

CROSS-REFERENCE TO RELATED APPLICATION

This application claims the benefit of Korean Patent Application No. 10-2011-0086818, filed Aug. 30, 2011, under 35 U.S.C. §119(a). The entire content of the aforementioned application is incorporated herein by reference in its entirety.

BACKGROUND (a) Technical Field

The present invention relates to an apparatus for solidifying and converting carbon dioxide into carbonate. More particularly, it relates to an apparatus for solidifying and converting carbon dioxide into carbonate, which can stably solidify and convert carbon dioxide into carbonate minerals using steel slag or natural minerals.

(b) Background Art

Typically, a process for treating an exhaust gas containing carbon dioxide is employed in various industrial facilities which discharge exhaust gases containing carbon dioxide. However, a process for separating carbon dioxide is not essential, and the process for treating an exhaust gas containing carbon dioxide may be divided into a carbon dioxide separation and recovery process and a carbon dioxide solidification process.

Methods for solidifying carbon dioxide into carbonate in order to treat the separated and recovered carbon dioxide has recently gained much attention as an alternative to storing the treated carbon dioxide in the ground or under the ocean.

The purpose of the carbon dioxide solidification technique is to produce a carbon component by conversion of carbon dioxide, and to convert the produced carbon component into fuel or basic compounds required for industrial processes.

According to the carbon dioxide solidification technique, carbon dioxide, which causes global warming, is converted into stable compounds such as carbonate, which are environmentally advantageous and can be used as basic industrial raw materials.

Conventionally, a single reactor in which alkaline extraction and carbonation reaction occur simultaneously has been used. In this conventional method, the alkaline extraction and the carbonation reaction are not separated from each other, and the precipitate produced by the carbonation reaction of the extracted alkali component is deposited on the surface of slag as a raw material, thereby inhibiting the alkaline extraction. As a result, the reaction time required for the conversion into carbonate is increased and the conversion rate of carbon dioxide into carbonate is reduced.

Other drawbacks to the conventional method include difficulty in reusing the process water and the chemical solvent used for the extraction.

SUMMARY OF THE DISCLOSURE

In one aspect, the invention provides an apparatus for solidifying and converting carbon dioxide into carbonate, which can stably solidify and convert carbon dioxide into carbonate minerals using steel slag or natural minerals as starting materials, the apparatus comprising an extraction reactor for extracting an alkali metal component, a carbonation reactor for producing a carbonate precipitate by allowing the extracted alkali metal component to react with carbon dioxide, and a filtration device for separating the precipitate from a solution after a carbonation reaction.

In one aspect, the present invention provides an apparatus for solidifying and converting carbon dioxide into carbonate, the apparatus comprising:

(i) an alkali component extraction reactor for extracting an alkali metal component from a raw slag;

(ii) a carbonation reactor for injecting carbon dioxide into an alkali metal component solution containing the extracted alkali metal component to produce a carbonate precipitate from the alkali metal component solution;

(iii) a first filtration device connected between the alkali component extraction reactor and the carbonation reactor to separate a post-treatment slag, from which the alkali component is extracted, from the alkali metal component solution; and (iv) a second filtration device connected between an inlet of the alkali component extraction reactor and an outlet of the carbonation reactor to separate the carbonate from the alkali metal component solution after a carbonation reaction.

In one embodiment, the alkali component extraction reactor comprises: a reactor body comprising an inlet and an outlet at the top and bottom, respectively, and a plurality of baffles on an inner circumference of the reactor body at regular intervals; a stirrer connected to a stirrer drive means capable of rotation in the reactor body, to stir a mixture as process water comprising the raw slag, and a solvent; and a pH meter and a Ca concentration meter mounted on one side of the reactor body.

In certain embodiments, the solvent is acetic acid, $CH_3COONH_4$, $NH_4NO_3$, $HNO_3$, or $H_2SO_4$. In certain embodiments, the solvent is an aqueous solution of acetic acid, $CH_3COONH_4$, $NH_4NO_3$, $HNO_3$, or $H_2SO_4$. In a further embodiment, the solvent is acetic acid or an aqueous solution of acetic acid.

In another embodiment, the carbonation reactor comprises: a reactor body in which the alkali metal component solution reacts with carbon dioxide; an injection tube mounted on one side of the reactor body to inject the carbon dioxide into the alkali metal component solution; a pH meter and a pH regulator for regulating the amount of pH adjusting agent to be injected into the reactor, which are mounted on a side opposite the infection tube of the reactor body; and a Ca concentration meter for measuring the concentration of Ca to determine the amount of carbon dioxide to be injected.

In various embodiments, the pH adjusting agent is NaOH, KOH, $CaOH_2$, $NH_4OH$, or $NH_4(HCO_3)$.

In still another embodiment, the first filtration device comprises a pressure filter capable of removing particles having a particle size of about 2 μm to about 1000 μm, at a pressure of about 0 atmospheres to about 2 atmospheres, to concurrently to filter the post-treatment slag, from which the alkali component is extracted, and to supply the alkali component solution to the carbonation reactor.

In various embodiments, the removed particle size ranges from about 2 μm to about 100 μm. In various embodiments, the removed particle size ranges from about 2 μm to about 50 μm. In various embodiments, the removed particle size ranges from about 2 μm to about 10 μm. In various embodiments, the removed particle size ranges from about 10 μm to about 100 μm. In various embodiments, the removed particle size ranges from about 50 μm to about 500 μm.

In other embodiments, the pressure ranges from about 0 atmospheres to about 1 atmospheres. In other embodiments, the pressure ranges from about 1 atmospheres to about 2 atmospheres.

In yet another embodiment, the second filtration device comprises a pressure filter capable of removing particles having a particle size of about 2 µm to about 1000 µm, to concurrently filter the carbonate precipitate after the carbonation reaction and to circulate a residual solution to the alkali component extraction reactor.

In various embodiments, the removed particle size ranges from about 2 µm to about 100 µm. In various embodiments, the removed particle size ranges from about 2 µm to about 50 µm. In various embodiments, the removed particle size ranges from about 2 µm to about 10 µm. In various embodiments, the removed particle size ranges from about 10 µm to about 100 µm. In various embodiments, the removed particle size ranges from about 50 µm to about 500 µm.

Other aspects and preferred embodiments of the invention are discussed infra.

BRIEF DESCRIPTION OF THE DRAWINGS

The above and other features of the present invention will now be described in detail with reference to certain exemplary embodiments thereof. The drawings are meant for illustration purposes only, and are not meant to limit the invention.

Figure 1:
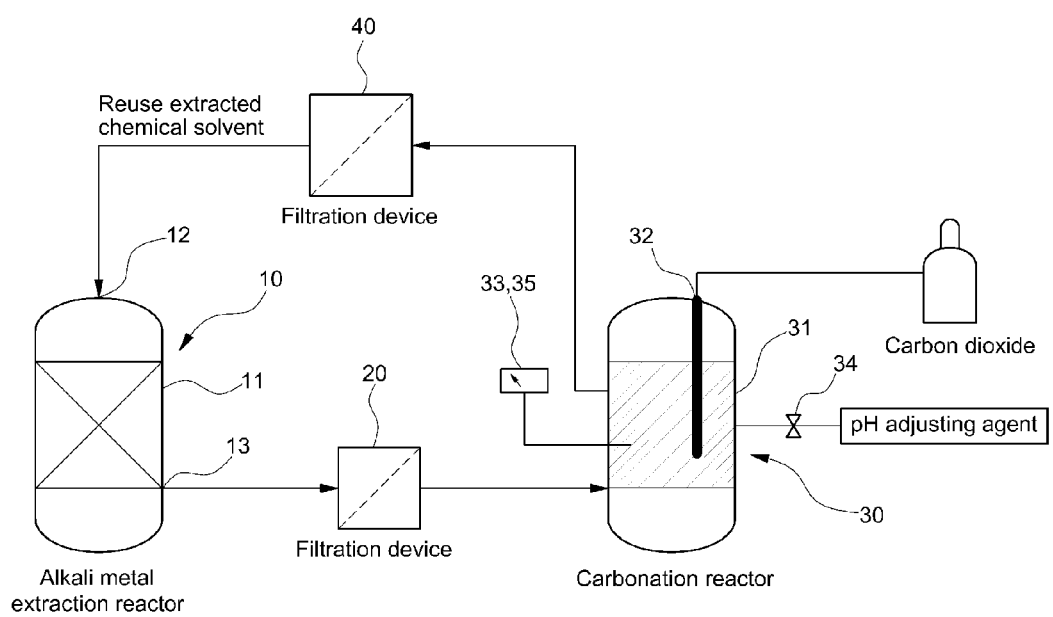
FIG. 1 is schematic diagram showing the configuration of an apparatus for solidifying and converting carbon dioxide into carbonate in accordance with a preferred embodiment of the present invention.
Figure 2:
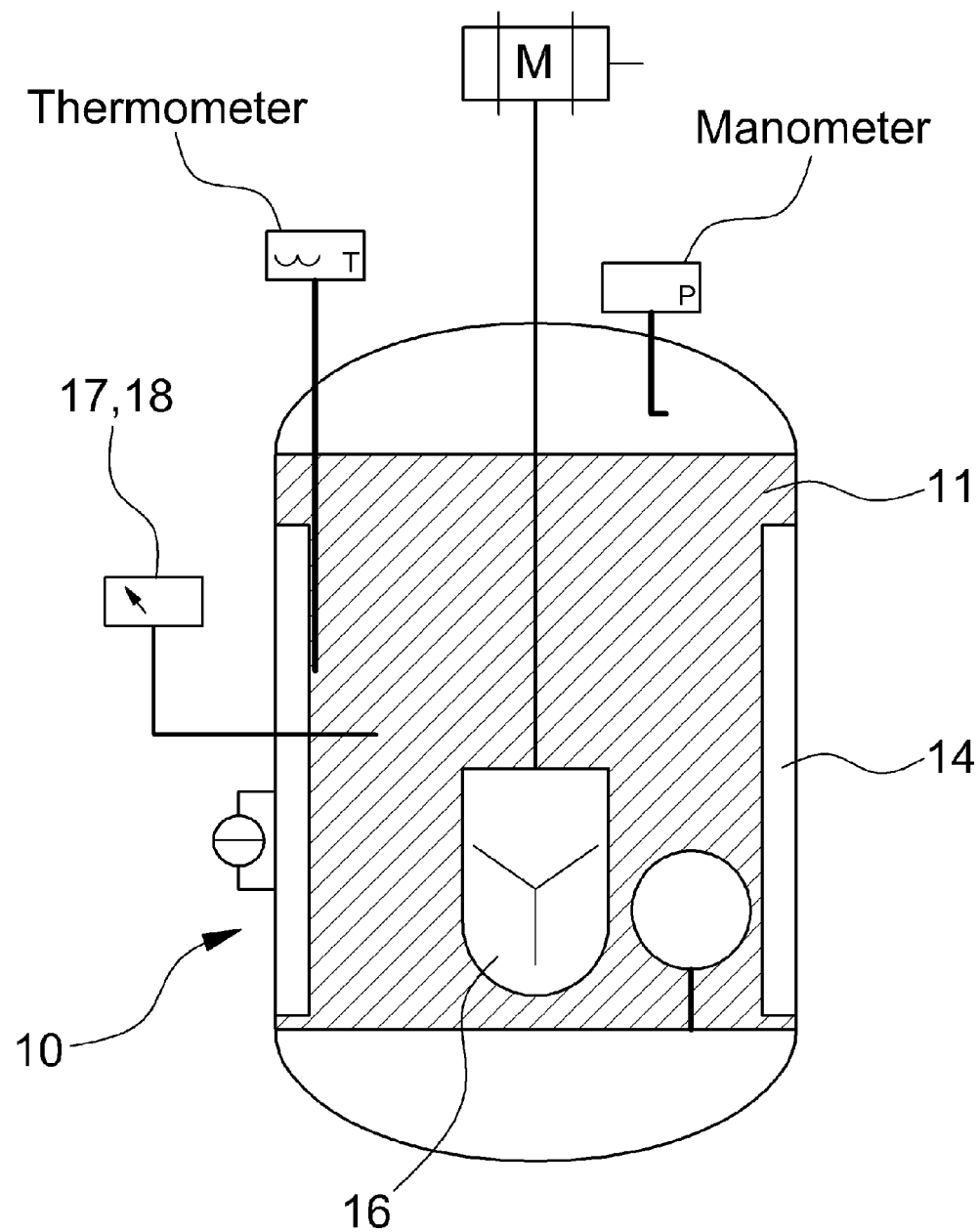
FIG. 2 is a schematic diagram showing the configuration of an alkali component extraction reactor of an apparatus for solidifying and converting carbon dioxide into carbonate in accordance with a preferred embodiment of the present invention.
Figure 3:
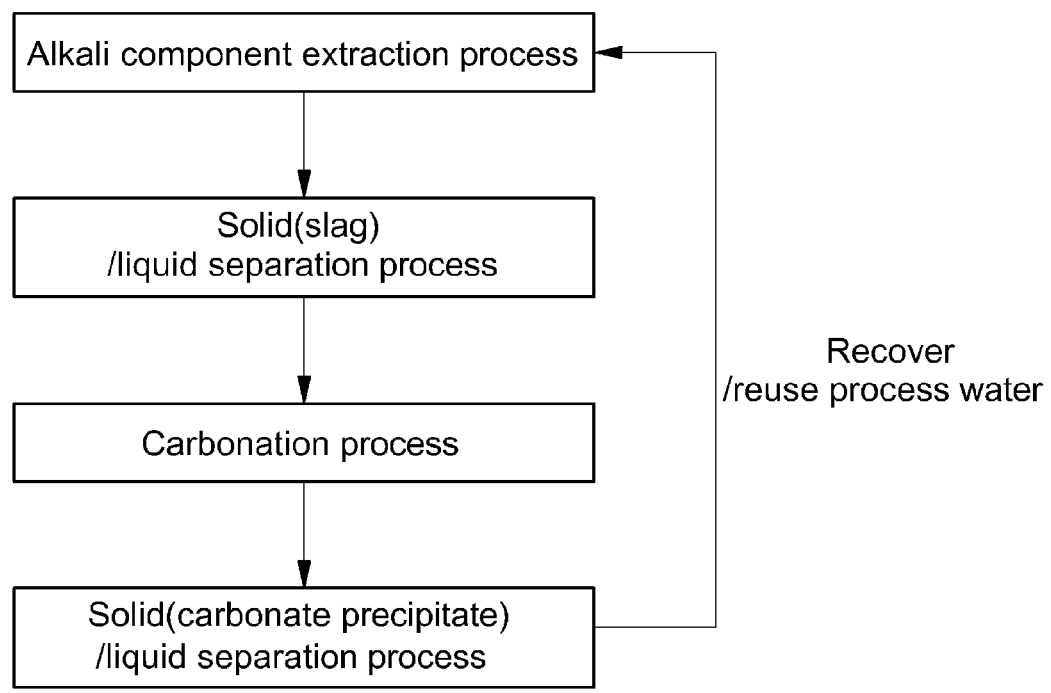
FIG. 3 is a process diagram showing the solidification and conversion of carbon dioxide into carbonate in accordance with a preferred embodiment of the present invention.

Reference numerals set forth in the Drawings includes reference to the following elements as further discussed below:

| | |
|---|---|
| 10: alkali component extraction reactor | |
| 11: reactor body | 12: inlet |
| 13: outlet | 14: baffle |
| M: stirrer drive means | 16: stirrer |
| 17: pH meter | 18: Ca concentration meter |
| 20: first filtration device | 30: carbonation reactor |
| 31: reactor body | 32: injection tube |
| 33: pH meter | 34: pH regulator |
| 35: Ca concentration meter | 40: second filtration device |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described below in detail with reference to the accompanying drawings such that those skilled in the art to which the present invention pertains can easily practice the present invention.

The present invention provides an apparatus for solidifying and converting carbon dioxide into carbonate, in which an alkali component extraction reactor 10, used for extracting an alkali component from steel slag or natural minerals, and a carbonation reactor 30, for injecting carbon dioxide into an alkali metal component solution containing the extracted alkali component to cause a carbonation reaction, are separately provided, and first and second filtration devices 20 and 40 are disposed between the alkali component extraction reactor 10 and the carbonation reactor 30, thereby significantly increasing the conversion rate of carbon dioxide into carbonate.

The alkali component extraction reactor 10 is used to extract an alkali metal component from any type of metal slags including steel slag or natural minerals. The alkali component extraction reactor 10 comprises a reactor body 11 which includes an inlet 12 provided in a predetermined position on the top of the reactor body 11, an outlet 13 provided in a predetermined position on the bottom of the reactor body 11, and a plurality of baffles 14 provided on the inner circumference of the reactor body 11 at regular intervals in the circumferential direction to facilitate the mixing of the slag and a solvent for the alkali metal component extraction.

Moreover, a stirrer 16, connected to a stirrer drive means M (e.g., a motor), which is installed on the outside of the reactor body 11, is rotated in the reactor body 11 to stir a mixture, as process water (in which the slag is a raw material) and a solvent (e.g., acetic acid) are mixed.

Furthermore, a pH meter 17 for measuring the pH of the alkali metal component extracted from the slag, and a Ca concentration meter 18 for measuring the concentration of Ca in the extracted metal component, are mounted in a predetermined position on one side of the reactor body 11.

Thus, the raw slag (e.g., any type of slags produced in the blast furnace steel-making process, electric furnace steel-making process, etc., and having a particle size of 8 mm or less without pulverization process) is supplied to the reactor body 11 of the alkali component extraction reactor 10 and, at the same time, an aqueous solution containing 5 to 30 vol % weak acetic acid as an extraction solvent is supplied thereto. Here, the ratio of the raw slag to the solvent solution (process water) containing acetic acid, i.e., the solid/liquid ratio, is about 1:500. In certain embodiments, the ratio is about 1:100. In certain embodiments, the ratio is about 1:50. In certain embodiments, the ratio is about 2:50. In certain embodiments, the ratio is about 2:20.

Subsequently, the stirrer is rotated by the operation of the stirrer drive means M to stir the mixture of the raw slag and the solvent solution containing the acetic acid. In certain embodiments, the stirring is carried out within 0 hour to about 12 hours at a velocity gradient of 1,800 $s^{-1}$ or less until a solution is extracted at a Ca extraction rate of 90%. In certain embodiments, the stirring is carried out within 0 hour to about 4 hours at a velocity gradient of 1,800 $s^{-1}$ or less until a solution is extracted at a Ca extraction rate of 90%. In certain embodiments, the stirring is carried out within 0 hour to about 2 hours at a velocity gradient of 1,800 $s^{-1}$ or less until a solution is extracted at a Ca extraction rate of 90%. In certain embodiments, the stirring is carried out within 0 hour to about 1 hour at a velocity gradient of 1,800 $s^{-1}$ or less until a solution is extracted at a Ca extraction rate of 90%.

Next, the resulting solution mixed with the alkali metal component extracted from the slag, passes through the outlet 13 of the reactor body 11 and is supplied to the first filtration device 20.

The first filtration device 20 serves to filter the post-treatment slag from which the alkali component is extracted in the alkali component extraction reactor 10 at a maximum pressure of 2 atmospheres or less and, at the same time, to supply the alkali component solution to the carbonation reactor 30. Preferably, a pressure filter capable of removing particles having a particle size of 2 μm or more may be used as the first filtration device 20.

Thus, with the use of the first filtration device 20, i.e., the pressure filter capable of removing particles having a particle size of 2 μm or more, the post-treatment slag from which the alkali component is extracted, and the solution containing the alkali metal component, are separated from each other at a maximum pressure of 2 atmospheres or less. Here, the rate of the alkali component solution fed into the carbonation reactor 30 may preferably be 90% or more.

Then, when the extracted alkali component solution is fed into the carbonation reactor 30, carbon dioxide is injected into the alkali component solution to cause a reaction that produces a carbonate precipitate.

The carbonate reactor 30 comprises a reactor body 31 in which the alkali component solution reacts with the injected carbon dioxide. An injection tube 32 connected to a carbon dioxide source is connected to the top of the reactor body 31 to inject the carbon dioxide into the reactor 30. Moreover, a pH meter 33 for measuring the pH of the mixture and a Ca concentration meter 35 for measuring the concentration of Ca to determine the amount of carbon dioxide to be injected into the reactor 30 are mounted on one side of the reactor body 31. Furthermore, a pH regulator 34 for automatically regulating the amount of pH adjusting agent to be injected into the reactor 30 is mounted on the other side of the reactor body 31.

The carbonation reactor 30 produces a carbonate precipitate by injecting carbon dioxide into the alkali component solution through a carbonation process. Preferably, a pH adjusting agent (e.g., NaOH) is added to increase the pH to the range of 10 to 12 before injecting carbon dioxide.

In certain embodiments, the pH value where the carbonation reaction readily occurs is about 7.5 to about 12.0. In various embodiments, the pH range is about 7.5 to about 9. In various embodiments, the pH range is about 9 to about 10.5. In various embodiments, the pH range is about 10 to about 12.

Accordingly, the pH meter 33 mounted on the carbonation reactor 30 measures the pH of the alkali component solution. Then, a controller (not shown) opens and closes the pH regulator 34 for regulating the amount of pH adjusting agent, which may be a solenoid valve type device, based on the measurement results such that the pH adjusting agent (NaOH) in an amount that can adjust the pH of the alkali component solution to the range of 10 to 12 is added.

Moreover, in order to determine the amount of carbon dioxide to be injected into the carbonation reactor 30, the Ca concentration meter 35 measures the concentration of Ca in the alkali component solution. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 10:1. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 5:1. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 2:1. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 1:10. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 1:5. In certain embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 1:2. in various embodiments, the amount of carbon dioxide to be injected into the carbonation reactor 30 is determined by measuring the concentration of Ca in the alkali component solution such that the ratio of $CO_2$ flow rate (mol) to Ca concentration (molar concentration) is 1:1.

Thus, as the carbonation reaction occurs in the carbonation reactor 30, a carbonate precipitate is produced from the alkali metal component solution.

In the next step, the alkali metal component solution containing the produced carbonate precipitate after the carbonation reaction is sent to the second filtration device 40 such that the carbonate precipitate is separated from the alkali metal component solution.

The second filtration device 40 is connected between an inlet of the alkali component extraction reactor 10 and an outlet of the carbonation reactor 30 to filter the carbonate precipitate after the carbonation reaction and, at the same time, to circulate the residual solution (i.e., the alkali metal component solution after the carbonation reaction) to the alkali component extraction reactor 10. To this end, a pressure filter capable of removing particles having a particle size of 2 μm or more may preferably be used as the second filtration device 40.

As a result, when the alkali metal component solution containing the produced carbonate precipitate after the carbonation reaction passes through the second filtration device 40, the carbon precipitate is filtered by the second filtration device 40, and the residual solution (i.e., the alkali metal component solution after the carbonation reaction) is recirculated to the alkali component extraction reactor 10 and reused in the alkali metal component extraction process.

As described above, the present invention provides the following advantages.

The apparatus of the invention allows for the alkali component extraction and the carbonation reaction continuously occur. As a result, it is possible to easily extract the alkali metal component in an amount of about 90% or more from the slag, etc., and to significantly increase the conversion rate of carbon dioxide into carbonate by allowing the extracted alkali metal component to react with carbon dioxide.

Moreover, after the carbonate precipitate is separated from the residual solution whose pH is reduced after the carbonation reaction, the residual solution can be circulated to the alkali component extraction reactor and reused in the alkali component extraction process.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The contents of all references (including literature references, issued patents, published patent applications, and co-pending patent applications) cited throughout this application are hereby expressly incorporated herein in their entireties by reference.

What is claimed is:

1. An apparatus for solidifying and converting carbon dioxide into carbonate, the apparatus comprising:
    an alkali component extraction reactor for extracting an alkali metal component from a raw slag;
    a carbonation reactor for injecting carbon dioxide into an alkali metal component solution containing the extracted alkali metal component to produce a carbonate precipitate from the alkali metal component solution;
    a first filtration device connected between the alkali component extraction reactor and the carbonation reactor to separate a post-treatment slag, from which the alkali component is extracted, from the alkali metal component solution; and
    a second filtration device connected between an inlet of the alkali component extraction reactor and an outlet of the carbonation reactor to separate the carbonate from the alkali metal component solution after a carbonation reaction,
    wherein the alkali component extraction reactor comprises a reactor body comprising an inlet and an outlet at the top and bottom, respectively, a plurality of baffles on an inner circumference of the reactor body at regular intervals in an circumferential direction, and a stirrer connected to a stirrer drive means capable of rotation in the reactor body, to stir a mixture of process water comprising the raw slag and a solvent.

2. The apparatus of claim 1, wherein the alkali component extraction reactor further comprises:
    a pH meter and a Ca concentration meter mounted on one side of the reactor body.

3. The apparatus of claim 1, wherein the carbonation reactor comprises:
    a reactor body in which the alkali metal component solution reacts with carbon dioxide;
    an injection tube mounted on one side of the reactor body to inject the carbon dioxide into the alkali metal component solution;
    a pH meter and a pH regulator for regulating the amount of pH adjusting agent to be injected into the reactor, which are mounted on a side opposite the injection tube of the reactor body; and
    a Ca concentration meter for measuring the concentration of Ca to determine the amount of carbon dioxide to be injected.

4. The apparatus of claim 1, wherein the first filtration device comprises a pressure filter capable of removing particles having a particle size of about 2 μm to about 1000 μm, at a pressure of about 0 atmospheres to about 2 atmospheres, to concurrently filter the post-treatment slag, from which the alkali component is extracted, and to supply the alkali component solution to the carbonation reactor.

5. The apparatus of claim 1, wherein the second filtration device comprises a pressure filter capable of removing particles having a particle size of about 2 μm to about 1000 μm, to concurrently filter the carbonate precipitate after the carbonation reaction and to circulate a residual solution to the alkali component extraction reactor.

* * * * *